June 20, 1933. H. D. WEED 1,914,965
TIRE CHAIN CROSS MEMBER
Filed June 20, 1932
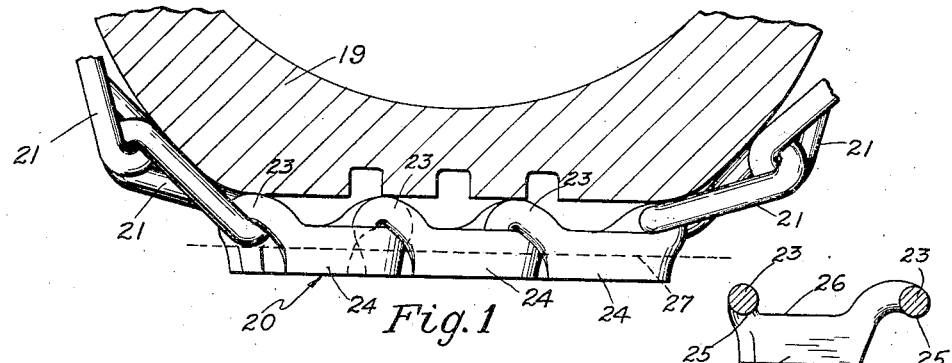
Fig. 1  Fig. 5
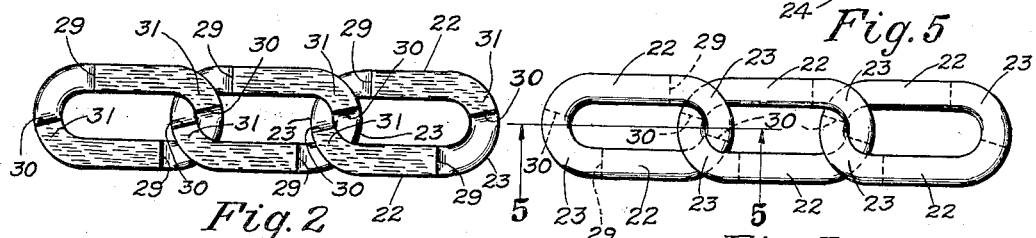
Fig. 2  Fig. 3
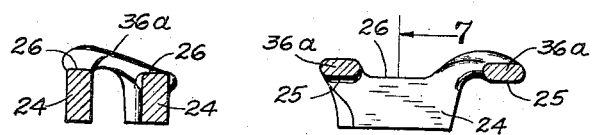 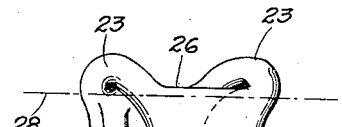
Fig. 7  Fig. 6  Fig. 4
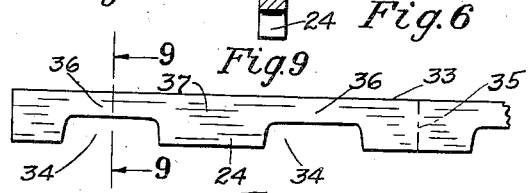 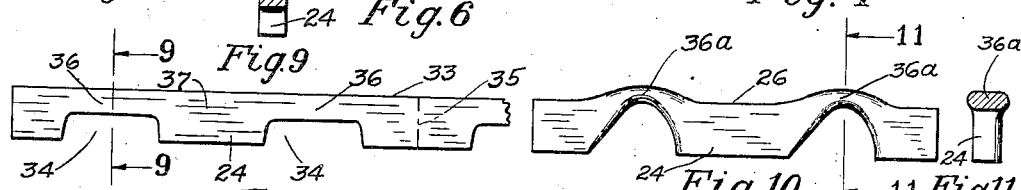
Fig. 9  Fig. 8  Fig. 10  Fig. 11
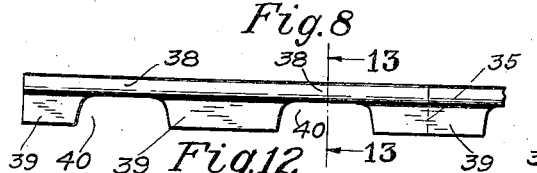
Fig. 12  Fig. 14
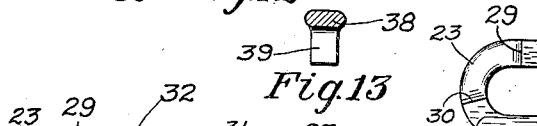
Fig. 13  Fig. 15
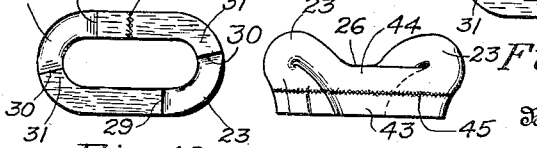 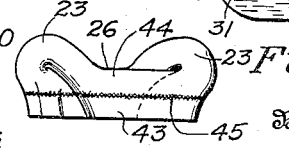
Fig. 16  Fig. 17  Fig. 18
Inventor
Harry D. Weed
By Wooster & Davis
Attorneys Patented June 20, 1933

1,914,965

UNITED STATES PATENT OFFICE

HARRY D. WEED, OF SOUTHPORT, CONNECTICUT

TIRE CHAIN CROSS MEMBER

Application filed June 20, 1932. Serial No. 618,203.

This invention relates to a cross member for anti-skid tire chains and the method of making it, and has for an object to provide such a cross member of a construction which will have a greater amount of wearing material which must be worn off before the cross member will break or fail, and thus greatly increases the life of the cross members.

It is a further object of the invention to provide an improved cross member which will have a better gripping surface on the road, increasing the anti-skid properties.

Another object is to provide a construction in which the overlapping and connecting end portions of adjacent links are located some distance above the road surface so that they are protected and are not subject to wear by engagement with the road until the material provided for that purpose is first worn off.

Still another object is to provide a construction of cross member in which the side members of the links are provided with additional wearing material to engage the road surface, and which material is extended under the overlapping portion of an adjacent link to support it so that the links will not be crushed down under the weight of the car.

A still further object is to provide a link construction which is strengthened at the overlapping end portions so that the link does not need to be welded.

With the foregoing and other objects in view the invention consists in certain novel features of construction, combination and arrangement of elements, with the method of making them, as will be more fully disclosed in connection with the accompanying drawing.

In this drawing:

Fig. 1 is a cross portion of the lower portion of a tire showing a cross member involving my invention in side elevation;

Fig. 2 is a bottom plan view of the three tread links of the cross member;

Fig. 3 is a top plan view thereof;

Fig. 4 is a side elevation of a single link;

Fig. 5 is a longitudinal vertical section of a single link substantially on line 5—5 of Fig. 3;

Fig. 6 is a longitudinal section of the link showing a slightly modified construction;

Fig. 7 is a transverse section substantially on line 7—7 of Fig. 6;

Fig. 8 is a side elevation showing the first steps in the formation of the link;

Fig. 9 is a transverse section substantially on line 9—9 of Fig. 8;

Fig. 10 is a side elevation showing the next operation in the forming of the link;

Fig. 11 is a transverse section on line 11—11 of Fig. 10;

Fig. 12 is a side elevation of an element of a somewhat different shape which can be used for forming a link and indicating the first operation;

Fig. 13 is a transverse section on line 13—13 of Fig. 12;

Fig. 14 is a side elevation of the element in Fig. 12 showing the next operation;

Fig. 15 is a transverse section on line 15—15 of Fig. 14;

Fig. 16 is a bottom plan view of a link separate from the remaining links;

Fig. 17 is a side elevation of the link showing a slightly modified construction; and Fig. 18 is a bottom plan view of a link of a slightly different construction.

A section of the tire is indicated at 19 and the cross member of the anti-skid chain as illustrated comprises any desired number of tread links 20, in the present case three being used, and twisted side links 21 for connecting the cross member to the side chains (not shown) extending around the periphery of the tire at the opposite sides thereof.

My invention relates principally to the tread links 20 and the method of making them. Under modern conditions of operation of automobiles at high speed portions of the chains are rapidly worn resulting in early breakage due to wear on the hard surface of the road and also pounding instant to high speeds. In view of these difficulties I have provided an improved link construction in which a relatively large amount of additional wearing material is provided on the portions which engage the road surface and have located the connecting portions above these wearing portions so that they do not engage the road surface. The additional wearing material greatly increases the life of the links, as does also the fact that the connecting portions cannot be weakened by wear with the road surface until the additional wearing portions have been worn off. I also so locate the additional wearing portions that they support the overlapping portions of the adjacent links and prevent their being crushed down by the weight of the car.

As shown on the drawing each link 20 is of oblong shape comprising side members 22 and looped end portions 23. It will be seen that the side members 22 have additional metal 24 on their undersides which may be of various thicknesses as found desirable, but ordinarily if the links were made of round bar stock the additional material would be about the thickness of the stock, thus making the side members 22 of a height substantially twice the thickness of the stock.

The looped or connecting end portions 23 are curved upwardly from the side members 22 as indicated, and preferably the highest point of the underside indicated at 25 is substantially on the same level as the top surface 26 of the side members 22. Thus when they are connected with the looped end portions of adjacent links the lowest point of the loop of the adjacent link will not be more than the vertical thickness of the loop below the top surface 26, which is indicated by the dotted line 27, in Fig. 1. Thus there is provided entirely below the looped or connecting end portion of the links a large amount of wearing material which must be worn off before the connecting end portions will begin to wear from contact with the road surface. In actual practice it has been found that the links will wear to a relatively short distance below the top portions 26 of the side members before giving away, this being indicated approximately by the dot and dash line 28 of Fig. 4.

This increased wearing material also provides additional support for the overlapping portions of the link. Thus as indicated in Figs. 2 and 3 this additional wearing material 24 extends from a point 29 at approximately the beginning of the curve of the looped end and extends through the length of the side member and is curved around under a portion of the loop at the other end to a point 30, and it will be clearly seen from these figures that when the links are interconnected this inwardly curved portion 31 lies under the overlapped looped portion 23 of the adjacent link. Therefore as this additional material extending from point 29 to point 30 is in direct engagement with the road surface this curved-in portion 31 forms a direct support for the overlapped portion 23 of the adjacent link. These overlapped portions therefore are always supported in the proper elevated position and the links cannot crush down under the weight of the car. Also as the connected loop portions 23 are curved upwardly above the top surfaces 26 of the side members they provide raised portions or nubs which embed themselves somewhat in the tread of the tire to grip it and effectively hold against slipping thereon. This portion 24 not only supports the overlapping portion of the adjacent link but it also forms a reinforcement under this overlapping portion, and it will be evident from the drawing that all of the reinforcement to the side members of the link or all the additional weight is all wearing material for use in engagement with the road. Thus although these links are somewhat heavier than the ordinary round rod links, all the additional material is wearing material. This is important as it is essential with cars running at high speed as they do today that the chain be made as light as possible on account of centrifugal force.

It will also be evident from an inspection of Fig. 2 that the ground contact portions 24 due to the curved end portions 31 are overlapping in a direction longitudinally of the links. It will be seen the curved portions 31 of one link overlaps the corresponding curved portion of the adjacent link in a direction longitudinally of the link. They therefore form in effect overlapping ground engaging contacts which make a continuous jointed tread transversely of the tire. It will also be evident that due to the curved-in portion 31 shoulders or ground engaging portions are formed laterally of the straight side engaging portions thus preventing longitudinal slipping of the link, or that is, slipping transversely of the tire. The tread or ground engaging portion is also flat with sharp edges thus increasing the grip on the road, and the tread retains substantially this shape throughout the entire wearing life.

In the links shown in Figs. 1, 2, 3 and 5 the overlapping looped end portions 23 are shown substantially circular in cross section. They may, however, be made of different shapes and as shown in Figs. 6 and 7 they are made oval or oblong in cross section with the greatest width in the plane of the link so as to increase the strength and stiffness of these connecting portions in the plane of the link to prevent the link opening up. Thus these connecting portions have sufficient strength to prevent the link opening up even though the side members are not welded at the joint as indicated at 32, Fig. 16. These links therefore can be made of alloy steels which have great resistance to wear and abrasion even though they do not weld readily, and of course, they may be made of the usual steels that can be welded.

In Figs. 8 to 15 are disclosed the steps of improved method of making these links. In Figs. 8 and 9 a straight bar of rectangular stock is shown at 33. At proper locations one side is removed or cut away to form recesses 34, and the stock may be cut off as indicated at 35 to proper length for the link. The reduced portion 36 above the recesses is used to form the connecting loop portion 23, while the portion between the recesses of the full width of the bar as indicated at 37 forms the additional wearing material 24 of the finished link. The portion 36 may be either cut or shaped to a substantially circular cross section as indicated in Fig. 5, or it may be shaped to an oval or oblong cross section as indicated in Figs. 6, 7 and 11. Ordinarily the next operation after cutting out the portions to form the recesses 34 is to shape the reduced portion 36, although the element may be bent to the form of the link and then the reduced portion shaped if preferred. This shaping is shown in Figs. 10 and 11 where it is reduced and shaped to the oblong or oval cross section as indicated at 36a, and it is also curved upwardly above the top edges 26 of the side portions 37 which correspond to the side portions 22 of the finished link. The bar may then be bent to the oval shape of Figs. 2 and 3, and 16 or 18, and the abutting ends welded to form a straight joint as indicated at 32, Fig. 16, or an inclined joint as shown at 32a, Fig. 18, or it may be left unwelded as indicated above thus greatly reducing the cost of manufacture. The joint is not necessarily located in the side of the link as shown, but may be placed in any convenient location.

As shown in Figs. 12 to 15, the links may be formed from a piece of bar stock rolled with a transverse oval section 38 at its upper portion, and a longitudinal rib 39 of less thickness for its lower portion. This rib may then be cut out to provide the recesses 40 corresponding to the recesses 34 in Fig. 8. The reduced connecting portion 41 may be then curved upwardly as indicated in Fig. 14 to form the reduced portion which when the link is bent to oval shape provides the looped end portions which overlap the similar portions of adjacent links connecting them together. It will be noted that this reduced portion is also raised above the top of the edge 42 of the side members, and as this reduced link portion 31 is wider in the plane of the link it has greater strength and stiffness in this direction to reduce strains tending to open the link and therefore the link need not necessarily be welded, greatly reducing the cost of manufacture. As the links are preferably made from bar stock the road engaging portion has square edges to grip on icy pavement and it presents these square edges to the pavement in all directions.

In the forming of the links so far described the additional wearing material 24 is not added to the link but is formed as an antiqual part of it. Thus no welding operations are necessary reducing the expense and doing away with points or corners which occur when a separate member is welded to the ordinary twisted links in which corners cracks easily start. This is the preferred construction, but I am not necessarily limited thereto as the links may be formed of stock of uniform size and shape, and then additional wearing material 43 welded on to the lower sides of the side members 44 as indicated at 45 in Fig. 17. With this link there is sufficient stock at the weld to give a strong dependable connection. The finished link is of substantially the same shape as the other links described.

It will be evident that these links can be readily manufactured and shaped to the proper form, and that as the lower point 25 of the connecting end loop portions is substantially on the level of the top of the side members except for the additional wearing material 24, the total height of the link is not greater than twice the diameter of the stock used. It will be evident that a large amount of additional wearing material is provided to engage the surface of the road, and thus the life of the link is greatly increased. Also that the shape of the surface engaging the road remains substantially the same throughout the life of the link, and therefore the gripping or anti-skid value remains substantially uniform throughout the life of the link. This is a great improvement over prior links where as nubs or projections quickly wear off the road gripping portion changes its shape so that the anti-skid value of a used chain is much less than that of a new chain.

Having thus set forth the nature of my invention, what I claim is:

1. A tire chain cross member comprising a plurality of links connected by raised portions at their ends, the side members being of greater thickness in a vertical direction than the end portions to provide additional wearing material and extending under the overlapping raised portion of the adjacent link to support it.

2. A tire chain cross member, comprising a plurality of links including side portions and raised end portions overlapping those of adjacent links, the side portions being of greater height than the end portions to provide additional wearing material and also extending under the overlapping raised portions to provide supports therefor.

3. A tire chain cross member comprising a plurality of links including side portions and connected overlapping raised end portions, the side portions being of greater thickness in a vertical plane than the end portions to provide increased wearing material, and said thicker portions being curved inwardly at their ends under the overlapped raised portion of an adjacent link to form a support therefor.

4. A tire chain cross member comprising a plurality of links including side portions and raised end portions overlapping those of adjacent links, the side portions being of greater height than the end portions and having ground engaging surfaces curved inwardly at one end under the raised end portions to provide overlapping ground contacts forming in effect a continuous jointed tread across the tire.

5. A tire chain cross member comprising a plurality of links including side portions and connected overlapping raised end portions, said side portions being provided on their undersides for substantially their entire length with additional wearing material to engage the road and extending under and supporting the raised end portions of adjacent links.

6. A tire chain cross member comprising connected links formed with side members and looped end portions bent upwardly in such a manner that the highest part of the lower edge of the end portion is at substantially the same level as the tops of the side members, said side members being reinforced on their undersides to provide increased wearing material, and said reinforcements extending under and supporting the overlapping portions of adjacent links.

7. A tire chain cross member comprising a series of open links the sides of which are parallel to the road surface and the ends of which form raised loops, said sides being provided with extra wearing material on their under sides which extends under the overlapping raised portion of the adjacent link to support it.

8. A tire chain cross member comprising a series of open links having side members and raised overlapping end portions, said side members being each provided with extra wearing material on its underside extending from a point adjacent the raised overlapped portion of the adjacent link at one end to and under the raised overlapped portion of the adjacent link at the other end to support it.

9. A link for a tire chain cross member comprising side portions lying in the same plane and raised twisted connecting portions at the ends, and said link having reinforcements on its underside completely encircling the link except for a short distance under the ends to form a notch to receive the underlying twisted portion of an adjacent link.

10. An anti-skid cross chain for tires having the greater portion of the opposite sides of its tread links disposed in the same flat plane and with the ends raised and twisted to form connecting portions and said sides being reinforced with extra metal on their undersides extending under the raised twisted end of the adjacent link.

11. A link for a tire chain cross member comprising a piece of bar stock bent into a loop and with portions at each end of the link of less height than the intermediate portions, and said reduced portions being raised above the intermediate portions.

12. A link for a tire chain cross member comprising side portions and raised connecting end portions, the side portions having reinforcements to engage the road and extending substantially the length of the side portions and partially around under the raised end portions.

13. A tire chain cross member composed of open links having side portions provided with extra wearing material on their under sides forming a continuous jointed tread across the tire, said links including raised looped end portions, said side portions lying in the same plane and forming a support for the raised looped portions of adjacent links.

14. A tire chain cross member composed of open links having enlarged portions forming the opposite sides thereof and raised looped end portions connecting the side portions, said enlarged portions on one side overlapping those on the other side to form an overlapping jointed tread across the tire, said enlarged portions lying in the same plane and forming a support for the raised looped end portions of the adjacent links.

In testimony whereof I affix my signature.

HARRY D. WEED.